United States Patent [19]

Blatt

[11] 4,214,737

[45] Jul. 29, 1980

[54] ADJUSTABLE SHOCK ABSORBER INCLUDING METERING PIN AND RESERVOIR STRUCTURE

[76] Inventor: Leland F. Blatt, 31915 Groesbeck Hwy., Fraser, Mich. 48026

[21] Appl. No.: 38,256

[22] Filed: May 11, 1979

[51] Int. Cl.³ .............................................. F16F 9/48
[52] U.S. Cl. ................................. 267/8 A; 188/285; 188/289; 188/315; 188/274; 267/137; 267/138; 267/139; 280/710
[58] Field of Search ............... 188/289, 315, 274, 282, 188/318, 269, 285; 267/8 A, 64 R, 64 B, 124, 137, 138, 139; 16/51, 52; 213/43; 280/708, 709, 710

[56] References Cited

U.S. PATENT DOCUMENTS

| | | | |
|---|---|---|---|
| 2,834,039 | 5/1958 | Sasse | 188/318 X |
| 3,584,712 | 6/1971 | Dickinson | 188/318 X |
| 3,731,770 | 5/1973 | Bindon | 188/318 X |
| 3,892,298 | 7/1975 | Blatt | 188/289 |
| 3,991,863 | 11/1976 | Lee | 188/318 X |

FOREIGN PATENT DOCUMENTS

| | | | |
|---|---|---|---|
| 154395 | 12/1953 | Australia | 188/274 |
| 1081669 | 6/1954 | France | 188/315 |
| 159411 | 12/1963 | U.S.S.R. | 188/318 |

*Primary Examiner*—George E. A. Halvosa
*Attorney, Agent, or Firm*—Cullen, Sloman, Cantor, Grauer, Scott, & Rutherford

[57] ABSTRACT

A shock absorber has a body with a bore and a secondary chamber housing a preloaded floating piston. An apertured piston and rod assembly with a float valve is retracted in the bore when the piston rod extending from the body is engaged by a moving body to be decelerated and smoothly stopped. A variable orifice head in the bore bleeds liquid through a series of passages to a return chamber which communicates with a hollow metering pin. This pin directs liquid through the piston and through outlets into a secondary chamber whose floating piston retracts against a spring as the chamber fills with liquid. This maintains a preload pressure upon the liquid in the bore and pressure chamber. The metering pin is tapered and is loosely received by the piston. When a load is axially applied to the piston rod retracting the pressure piston into the preloaded liquid within the body the liquid initially flows between the piston and metering pin. At a predetermined distance and due to the increasing diameter of the metering pin, flow through the piston is blocked, the majority of the fluid being metered through an adjustable orifice, through the metering pin and then into the pressure chamber retracting and maintaining a preload on the floating piston and bringing the piston with its load to a smooth stop at the end of the stroke. An orifice adjusting pin extends radially outward of the assembly to facilitate adjustment. The barrel defining the secondary chamber is aluminum and longitudinally fluted for maximum heat dissipation.

5 Claims, 6 Drawing Figures

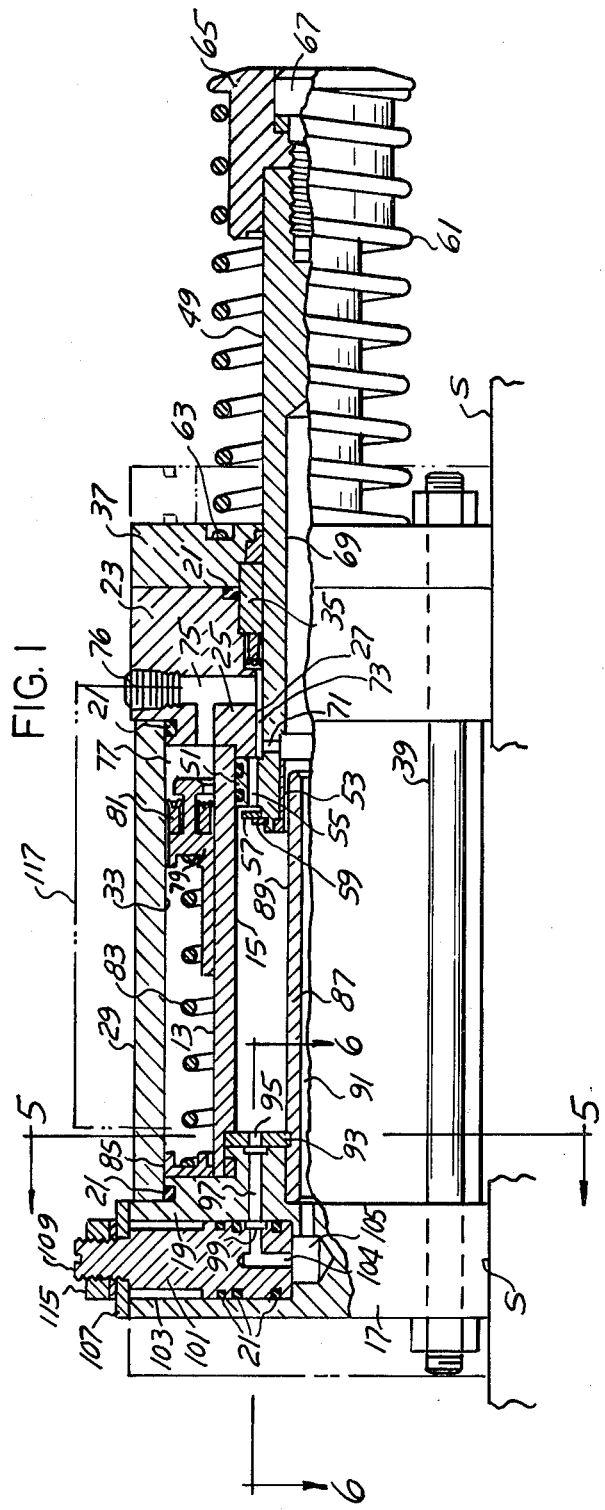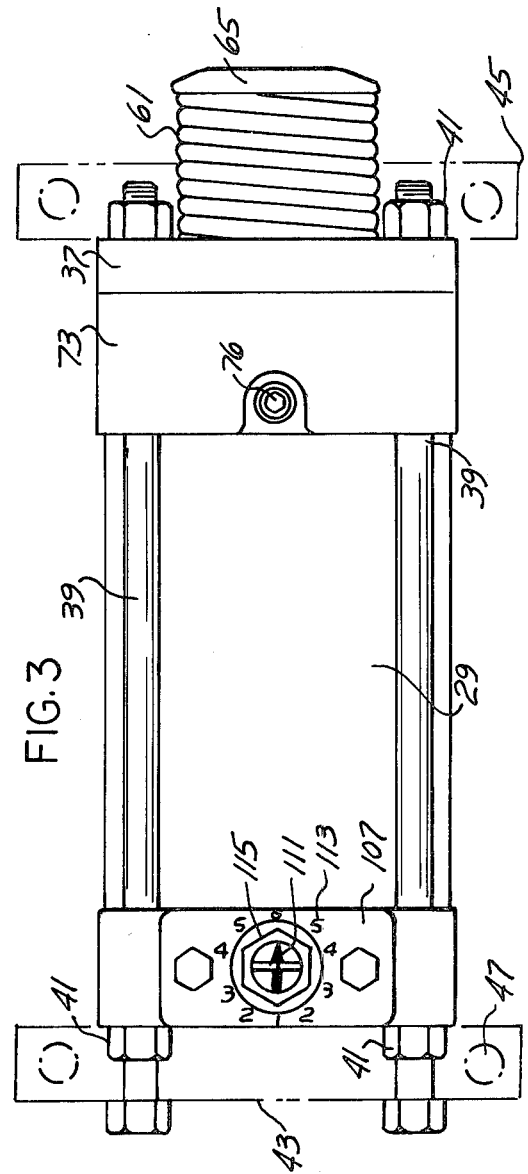

ADJUSTABLE SHOCK ABSORBER INCLUDING METERING PIN AND RESERVOIR STRUCTURE

BACKGROUND OF THE INVENTION

The present invention represents an improvement in the variable orifice shock absorber shown in my U.S. Pat. No. 3,892,298 dated July 1, 1975.

One of the problems of shock absorbers today is the effectiveness by which a longitudinally movable load at the end of its stroke is effectively slowed down and smoothly stopped. Further there is a need for an efficient means of dissipating the heat energy developed in the forceful metering of displaced liquids from the main bore of the retracting power piston to a secondary chamber to which the liquid is transported and pressurized.

Heretofore difficulties have been encountered in providing a convenient means of selectively and adjustably controlling the metering of liquids from the bore of the power cylinder and into a storage pressure chamber, and further in defining a means by which the flow metering can be preselected and set for a particular load.

SUMMARY OF THE INVENTION

The present shock absorber has a body with a bore and a concentric secondary chamber housing a preloaded floating piston. An apertured piston and rod assembly with a float valve is retracted in the bore when the piston rod extending from the body is engaged by a moving mass to be decelerated and smoothly stopped. A variable orifice head in the bore directs fluid through a series of passages which communicate with a hollow metering pin for directing fluid through the piston and through passages into the secondary chamber whose floating piston moves against a spring as the chamber fills with liquid for the purpose of maintaining a preload pressure upon the liquid within the bore and within the chamber.

The metering pin within the bore is tapered so that as the piston retracts, the flow of energy absorbing fluid which initially passes through the piston between the piston and the adjacent end of the metering valve is gradually reduced due to the taper on said metering pin. After the piston reaches a predetermined point so as to closely engage the metering pin, the displaced liquid within the bore is transmitted through the variable orifice head and into a return chamber and through the length of the metering pin, thence into the pressure chamber for pressurizing the floating piston therein.

On removal of the load from the piston rod, the piston is biased outward by a coil spring, the float valve upon the piston opens and unmetered liquid returns to the bore from the pressure chamber from the spring pressure upon the floating piston therein.

The primary object of the present invention is to provide an improved shock absorber whereby a load that is sharply applied axially to the striker cap on the piston rod, retracts the piston assembly into the preloaded fluid filled body, and wherein the float valve closes forcing the fluid to flow through the piston and relative to the tapered metering pin. At a predetermined distance and due to the outward taper of the metering pin the surfaces thereof become substantially parallel for completely closing off all but a slidable gap between the pin and the piston. This results in the displaced fluid being metered through the eccentric orifice in an adjusting pin, the fluid passing through a return chamber and through the metering pin and back into the pressure chamber. This brings the load to a smooth stop.

Fluting is provided upon the exterior barrel defining the pressure chamber increasing the exposed surface thereof and to allow for increased radiation of heat from the energy absorbing liquids.

These and other objects will be seen from the following Specification and Claims in conjunction with the appended drawing:

THE DRAWINGS

FIG. 1, is a fragmentary partly broken away longitudinal section of a shock absorber taken in the direction of arrows 1—1 of FIG. 2.

FIG. 3, is a fragmentary plan view thereof.

Figure 2:
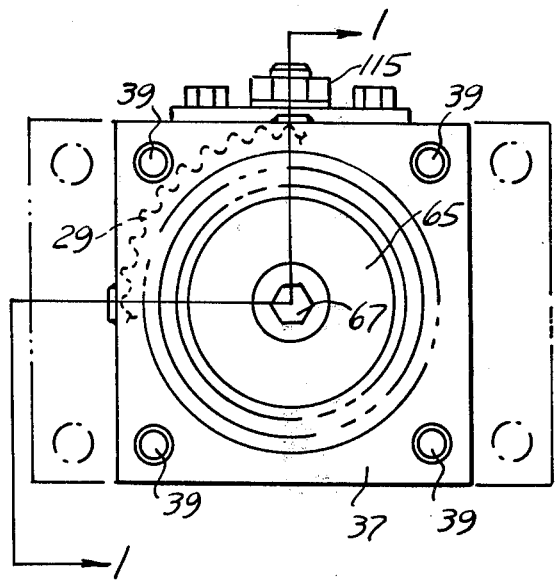
FIG. 2, is a right end elevational view thereof.
Figure 4:
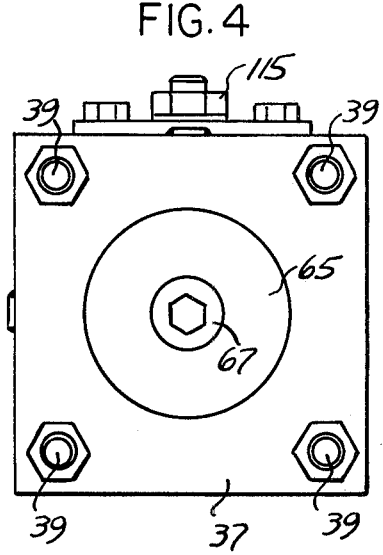
FIG. 4, is an end elevational view thereof.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings present adjustable metering shock absorber is generally indicated at 11, FIG. 1, as mounted upon a suitable support S, fragmentarily shown in FIG. 1 and includes an elongated cylindrical body 13 having a longitudinal bore 15 forming a pressure chamber.

Rear block 17, partly broken away and sectioned in FIG. 1 for illustration, includes a variable orifice head 19 which projects into one end of said body and is sealed therein as at 21 by a suitable O-ring seal. Front block 23 has an axial head 25 which projects into the opposite end of said body, includes a counterbore 27 or return passage and is similarly sealed over the opposite end of said body.

Figure 5:
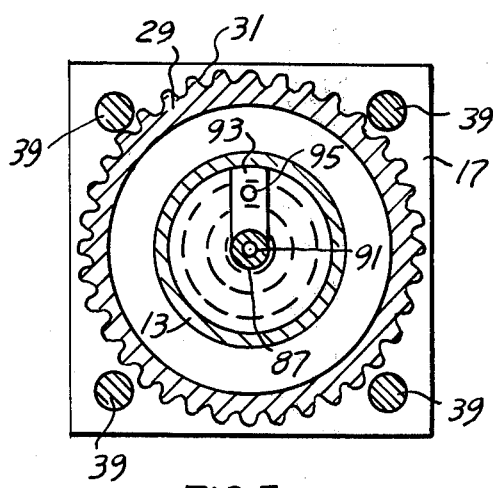
FIG. 5, is a fragmentary section taken in the direction of arrows 5—5 of FIG. 1.

Elongated barrel 29, preferably constructed of extruded aluminum for improved heat dissipation, overlies and surrounds body 13 and upon the exterior thereof has a series of radially extending elongated flutes 31, FIG. 5, which extend the length of said barrel and therearound for increased radiation of heat such as is generated during the operation of the shock absorber.

Said barrel has an elongated bore 33 which defines a power chamber 77 and is sealingly interposed between said front and rear blocks by additional O-ring seals 21.

Axial guide bushing 35 is partly nested within front block 23 and secured in position by the recessed retainer plate 37 which overlies said front block and is suitably secured thereto by a plurality of tie rods 39 anchored by fasteners 41.

Rear mount plate 43 bears against rear block 17, and front mount plate 45 bears against front block 23 and both are retained with respect to said blocks by the additional fasteners 41 which are threaded over extensions of the respective tie rods 39 in the manner shown in FIG. 3.

The respective mount plates 43 and 45 may be secured to the support surface as by the fasteners 47 shown in FIG. 3.

Reciprocal power piston 51 is nested and movable within the bore 15 of body 13, is centrally apertured and axially mounts thereon the piston bushing 53. Said piston has a series of spaced axial passages 55 extending therethrough.

The longitudinally adjustable float valve 57 is retained upon said piston by the retainer 59, FIG. 1, and is shown spaced from the passages 55 in a non-blocking situation, FIG. 1. Said float valve will move to a blocking position with respect to said passage when the piston is retracted upon application of a load to the piston rod 49. Said rod forms a part of piston 51, projects through the counterbore 27, extends through the guide bushing 35, is suitably sealed within front block 23 and the retainer plate 37 by a plurality of sealing devices generally indicated at 21 referred to as rod seals or O-ring seals.

The outer end of said piston rod has applied thereto a load engaging striker cap 65 fastened thereto as at 67 and which is normally biased outwardly to the position shown by the power piston spring 61. Said spring at one end is nested within an annular recess 63 within retainer plate 37, receives piston rod 49 and at its other end extends over and retainingly engages said striker cap, as in FIG. 1.

Said piston rod has a longitudinal bore 69 and at one end adjacent the power piston has a plurality of radial outlets 71 which communicate with the passage 73 and with the radial passages 75 for communication into the power chamber 77 upon one side of the floating piston 79 movably nested within the bore 33.

Said floating piston is sealed suitably interiorly and exteriorly by the outside and inside floating piston seals 81. Floating seal 81 is in sealing engagement with bore 33 of said barrel and the inner piston seal 81 is in cooperative sealing engagement upon the exterior surface of the body 13.

Spring 83 is a compression spring, which surrounds body 13 is nested within barrel bore 33 and at one end is supported by retainer 85. Its opposite end is in biasing engagement with floating piston 79. The variable orifice head 19 forms a part of rear block 17. One end the elongated metering pin 87, is mounted upon head 19. Its exterior surface is tapered inwardly towards the open end thereof so that in the retracted postion of the power piston 51 there is an annular space between the tapered end of the metering pin and the piston bushing 53 through which hydraulic fluids pass upon the initial retraction of the power piston with the application of a load to the piston rod.

Said metering pin has an elongated bore 91 of uniform diameter, and is retained with respect to the variable orifice head 19 by the transverse retainer plate 93 also shown in FIG. 5.

Figure 6:
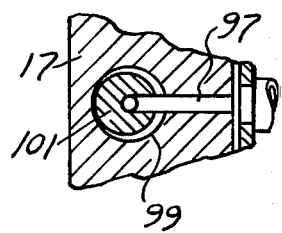
FIG. 6, is a fragmentary section taken in the direction of arrows 6—6 of FIG. 1.

Said retainer plate has a transverse slot 95 in communication with the passage 97 within the variable orifice head which at one end is in communication with the eccentric variable orifice 99 in adjusting pin 101, shown in FIGS. 1 and 6.

Transverse bore 103 extends into rear block 17 and is in communication with the hydraulic fluid return chamber 105 formed within said rear block which is in communication with one end of the metering pin.

Cylindrical adjusting pin 101 is eccentrically mounted within bore 103 and is retained therein by the apertured retainer plate 107 which receives the transversely slotted head 109 at one end of said pin.

The eccentric mounting of adjusting pin 101 within said bore defines the variable eccentric orifice 99, FIGS. 1 and 6 which is in communication with passage 97 in the variable orifice head 19 and in further communication with the axial bore 104 within said adjusting pin for the variable adjustment bleeding of hydraulic fluid from the body 13 during certain portions of the retraction of the power piston therein.

Referring to FIG. 3, upon the top of head 109 of adjusting pin 101 there is provided a transverse arrow shown at 111 which is in registry with the indicia 113, in the form of a circular scale which is applied to said retainer plate. This indicates the extent of the opening of the eccentric orifice 99 as best shown in FIG. 6. This opening may be selectively adjusted in a convenient manner due to the transverse arrangement of the adjusting pin and once adjusted may be secured in place by the lock nut 115, FIGS. 1 and 3.

The location of the slotted head 109 of the adjusting pin 101 upon the side of the barrel 29 at one end thereof provides a convenient and visual means by which the eccentric orifice 99 may be variably adjusted and secured in adjusted position as desired for regulating the extent of metering of hydraulic fluid from bore 15, through aperture 95, passage 77, passage 104 into return chamber 105 for direction through the metering pin.

While the passages 75 are closed by a plug 76, it is contemplated that under some conditions it may be desirable to have a bleed conduit 117 which interconnects passage 75 with the opposite end of power chamber 77. By this, some hydraulic pressure fluid is introduced into that end of the power chamber cooperative in assisting return movement of the floating piston action along with the expansive forces of the floating piston spring 83.

OPERATION

In the illustrative embodiment of the invention FIG. 1 shows a shock absorber in a normal position with the floating piston 179 adjacent one end of the power chamber 77 corresponding to bore 33 in barrel 29. Hydraulic fluid is designated as filling the bore 15, port 95, passage 97, orifice 99, passage 104, return chamber 105, metering pin 89, the bore 69 of the piston rod 49, the ports 71, passage 73, passages 55, passages 75, one end of the power chamber 77.

The primary objective is that a movable object, such as a carriage, towards the end of its stroke is to be slowed down and smoothly stopped. Said object, referred to as a load, is in axial engagement with strike cap 65 causing a retraction of the piston rod 49 and the associated power piston 51 within bore 15.

Since the metering pin is exteriorly tapered, as the piston retracts, the flow of energy absorbing fluid is relative to the gradual decrease in the taper of said metering pin until the piston reaches such a point as to snugly fit upon the parallel part of the metering pin. Up to that time a substantial portion of the hydraulic fluid within bore 15, moves through the annular passage defined by the piston bushing 53 directly to the bore 69 of said piston rod, radially outward through ports 71, through the passage 73 and passage 75 and into power chamber 77.

The retracting movement of the power piston causes the float valve 57 to move to the right of the position shown in FIG. 1 so as to block passages 55. During the initial retracting movement of the power piston, some hydraulic liquid within bore 15 will pass through the port 95 and passage 97 in the variable orifice head and on to the metering pin bore 91. A larger percentage however of the hydraulic liquid in the initial retraction of the power piston finds an easier passageway through the space between the end of the metering pin and the piston bushing 53 directly into the bore 69 of the piston rod. This flow of energy absorbing fluid is relative to the gradual decrease in the taper until a point is reached where the piston substantially fits snugly onto the parallel part of the metering pin thereby directing the majority of the fluid through the eccentric variably adjusted orifice 99 at the end of the passage 97. This metering flow of fluid from bore 15 leaves the orifice which is in communication with the radial passage 104 and fluid is transmitted to the return chamber 105 and thence through the length of the metering pin 87 again for communication within the bore 69 and the radial ports 71. It is this flow through the metering pin which decelerates the piston and will bring the piston with its load to a smooth stop at the end of the stroke. This corresponds to a positioning of the power piston 51 towards the opposite end of the body 13 from that shown in FIG. 1.

While the hydraulic fluid leaves the bore 15 initially through the bushing 53, thereafter the majority of the fluid flows through the bleed orifice 99, and the fluid accumulates within the power chamber 77 under pressure causing a retraction of the floating piston 79 against the action of the coil spring 83.

This places the entire system under pressure including power chamber 77 and the bore 15 of the body 13 housing the power piston.

Upon removal of the load from the piston rod, the power piston 51 is biased outwardly by spring 61. Float valve 57 opens to the position shown in FIG. 1 and an unmetered flow of fluid returns from power chamber 77 and passage 75 through the passages 55 to the bore 15. This is under the spring pressure on the floating piston, and the floating piston returns to the position shown in FIG. 1.

In operation when a load is sharply applied to the striker cap 65 the power piston is retracted into the preloaded fluid filled bore 15. Since the float valve closes shutting off the passages 55 within the piston, the initial flow is around the bushing 53. At a predetermined distance the metering pin becomes parallel completely closing all but a slidable gap between the metering pin and said bushing. Fluid is now being metered through the milled slot 95 of the metering pin retainer 93, across the eccentric adjusted orifice 99 to the return chamber 105 and thence through the elongated bore 91 of the metering pin into the bore of the piston rod, out through the ports 71 and passages 75 into power chamber 77. This flow of fluid through the orifice 99 is therefore a controlled and metered flow to decelerate and bring the load to a smooth stop.

MODIFICATION

Although pressure is present in the rod end of the chamber 77 a connection can be made as by the conduit 117, FIG. 1, to direct some pressure fluid into the blind end of bore 33 to create a faster or greater pressure on piston 79. This is for not only a speedier return, but also in case the piston rod is returned inside another pressurized device neccessitating extra pressure, to offset a differential pressure acting upon the piston rod 49.

The fluting 31 on the barrel 29, preferably constructed of aluminum, greatly increases the exposed surface of said barrel to allow for radiation and dissipation of the ever present heat which is generated in the absorbtion of energy in the operation of the present shock absorber.

By using extruded aluminum fluted barrel as at 31, FIG. 5, it is possible to dissipate heat 35% faster than with an unfluted barrel thus giving a much higher cycle time and greater seal life.

By arranging barrel 29 concentric with respect to the body 13 as shown in FIG. 1 the completely assembled shock absorber is considerably shorter than where the secondary chamber is arranged longitudinally of the power chamber, and therefore occupies much less space.

The flow adjustment of the shock absorber by the turning of the adjusting pin 101, at 109 is arranged 90° with respect to the axis of the piston rod and thereby protrudes from the blind end of the rear block 17 for better visibility and for ease of adjustment of the shock absorber as mounted upon the support surface S, FIG. 1.

Having described my invention reference should now be had to the following claims.

I claim:

1. A shock absorber comprising an elongated body having a bore filled with liquid;
    an elongated barrel, having a bore, spaced from and concentrically receiving said body, and forming a power chamber therebetween;
    spaced front and rear blocks sealingly receiving and secured to the ends of said body and barrel, defining with said barrel and body said power chamber and a pressure chamber respectively and closing said bores, said pressure and power chambers being in communication;
    a power piston having an axial bore and adjacent one end a plurality of radial ports communicating with said axial bore, and with one end of said power chamber, and a plurality of axial passages extending through said piston, and communicating with said pressure chamber;
    said piston being movable within said body and including a piston rod having a bore filled with liquid extending through said front block and outwardly of said body;
    an end cap on said rod adapted to be engaged by a moving mass toward the end of a longitudinal stroke;
    a coiled spring surrounding said rod and interposed between said cap and said front block normally biasing said rod outwardly of said body;
    a float valve movably mounted upon said piston, in registry with said passages closing said passages on retraction of said piston into said body and opening said passages on forward return movement of said piston;
    a floating piston sealed within said power chamber and movably mounted and sealed over said body;
    a coiled spring within said power chamber normally biasing said floating piston toward one end thereof;
    the retraction movement of said power piston causing the flow of fluid under pressure from said body through said power piston and into said power chamber retracting said floating piston against its biasing spring;
    there being a fluid return chamber in said rear block having an inlet and an outlet;

an axially apertured externally tapered metering pin at one end secured to said rear block in communicating with said outlet;

said pin extending the length of said body and axially into said power piston and piston rod bore forming an annular aperture therebetween and communicating with said ports and power chamber;

there being an elongated axial passage in said rear block communicating with said body bore and said return chamber;

retraction of said power piston over said metering pin dispersing fluid in said body through the annular aperture between said power piston and metering pin for delivery through said ports and into said power chamber;

said annular aperture decreasing in width as the pressure piston retracts due to the taper of said pin, the remaining fluid being bled into said return chamber and through said metering pin, through said ports and into said power chamber whereby said power piston with its load is decelerated and comes to a smooth stop at the end of its stroke;

a flow adjusting pin having a shank extending transversely of said barrel and rotatably mounted within said rear block and having a variable orifice communicating with said passage and with said return chamber inlet for variably selectively metering the return flow of the displaced liquid into and through said return chamber;

a retainer plate for said adjusting pin;

a calibrated scale upon said retainer plate surrounding said pin shank;

there being a marker on said shank in registry with said scale;

and friction means on said shank in operative registry with said plate for securing said adjusting pin in adjusted position;

said metering pin at its free end being spaced from the bore of said piston rod to define said annular aperture;

for receiving and directing displaced fluid to said power chamber on retraction of said power piston;

the metering pin increasing in diameter towards its opposite end, gradually closing off said annular space, so that the displaced liquid is adjustably metered through said return chamber.

2. In the shock absorber of claim 1, the mounting of said adjusting pin including a cylindrical aperture in said rear block, said adjusting pin being eccentrically mounted within said aperture, whereby rotary adjustment of said adjusting pin modifies the size of said orifice and the flow of liquid therethrough.

3. In the shock absorber of claim 1, said apertured retainer plate overlying and secured to said rear block axially retaining said adjusting pin;

said adjusting pin extending through said plate and terminating in a slotted shank portion to facilitate rotary adjustment thereof.

4. In the shock absorber of claim 1, a metering pin retainer plate within said body bore and secured against said rear block, said metering pin retainer plate retainingly engaging said metering pin;

said metering pin retainer plate having an aperture therethrough in registry with said passage.

5. In the shock absorber of claim 1, and a bypass conduit interconnecting said ports with the opposite end of said power chamber for directing some pressure liquid thereinto, thereby creating an increased load on said floating piston for speedier return movement thereof and to partly off set any differential pressure acting on said piston rod.

* * * * *